US011080316B1

(12) United States Patent
Das et al.

(10) Patent No.: US 11,080,316 B1
(45) Date of Patent: Aug. 3, 2021

(54) CONTEXT-INCLUSIVE FACE CLUSTERING

(71) Applicant: Amazon Technologies, Inc., Reno, NV (US)

(72) Inventors: Ranju Das, Seattle, WA (US); Wei Xia, Seattle, WA (US); Meng Wang, Seattle, WA (US); Xiaofeng Ren, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1035 days.

(21) Appl. No.: 15/607,199

(22) Filed: May 26, 2017

(51) Int. Cl.
| | | |
|---|---|---|
| *G06F 16/33* | (2019.01) | |
| *G06F 16/335* | (2019.01) | |
| *G06F 16/16* | (2019.01) | |
| *G06F 16/432* | (2019.01) | |

(52) U.S. Cl.
CPC .......... *G06F 16/337* (2019.01); *G06F 16/164* (2019.01); *G06F 16/434* (2019.01)

(58) Field of Classification Search
CPC ........... G06K 9/00288; G06K 9/00228; G06K 9/00248; G06K 9/00268; G06K 9/00295; G06K 9/6293; G06K 9/00241; G06K 9/00275; G06K 9/46; G06K 9/6215; G06K 9/6292; G06N 3/08; G06N 3/04; G06N 3/0454; G06N 3/0472; G06T 2207/30201; G06F 16/337; G06F 16/434; G06F 16/164
See application file for complete search history.

(56) References Cited

U.S. PATENT DOCUMENTS

| | | | | |
|---|---|---|---|---|
| 9,183,464 | B1 * | 11/2015 | Huang | G06K 9/6292 |
| 9,449,216 | B1 * | 9/2016 | Dhua | G06K 9/00261 |
| 9,465,813 | B1 * | 10/2016 | Li | G06F 16/122 |
| 10,601,821 | B2 * | 3/2020 | Du | G06F 21/45 |
| 10,638,135 | B1 * | 4/2020 | Wei | H04N 19/167 |
| 2007/0172099 | A1 * | 7/2007 | Park | G06K 9/6234 |
| | | | | 382/118 |

(Continued)

OTHER PUBLICATIONS

Tudor Barbu, "Unsupervised SIFT-based Face Recognition Using an Automatic Hierarchical Agglomerative Clustering Solution", 2013, Procedia Computer Science, vol. 22, pp. 385-394, ISSN 1877-0509, (https://doi.org/10.1016/j.procs.2013.09.116.) (Year: 2013).*

(Continued)

*Primary Examiner* — Paulinho E Smith
(74) *Attorney, Agent, or Firm* — Hogan Lovells US LLP (57) ABSTRACT

People represented in multiple images can be recognized using accurate facial similarity metrics, where the accuracy can be further improved using contextual information. A set of models can be trained to process image data, and facial features can be extracted from a face region of an image and passed to the trained models. Resulting feature vectors can be concatenated and the dimensionality reduced to generate a highly accurate feature vector that is representative of the face in the image. The feature vector can be used to locate similar vectors in a multi-dimensional vector space, where similarity can be determined based at least in part upon the distance between the endpoints of those vectors in the vector space. Context information from the image can be used to adjust the similarity determination. Similar vectors can be clustered together such that the faces represented by those images are associated with the same person.

20 Claims, 7 Drawing Sheets

(56) References Cited

U.S. PATENT DOCUMENTS

| | | | |
|---|---|---|---|
| 2008/0075336 A1* | 3/2008 | Luo .................... | G06K 9/00221 |
| | | | 382/118 |
| 2008/0089561 A1* | 4/2008 | Zhang .................... | G06K 9/623 |
| | | | 382/118 |
| 2012/0014562 A1* | 1/2012 | Berkovich ......... | G06K 9/00228 |
| | | | 382/103 |
| 2013/0227678 A1* | 8/2013 | Kang ................. | G06K 9/00335 |
| | | | 726/19 |
| 2014/0169680 A1* | 6/2014 | Tang .................... | G06K 9/4642 |
| | | | 382/197 |

OTHER PUBLICATIONS

Grant et al., "Hierarchical Clustering in Face Similarity Score Space", May 2016 (Year: 2016).*

Zhao et al., "Automatic Person Annotation of Family Photo Album", 2006, Springer-Verlag Berlin Heidelberg, pp. 163-172. (Year: 2015).*

Choi et all, "Face annotation for personal photos using context-assisted face recognition", 2008, In Proceedings of the 1st ACM international conference on Multimedia information retrieval (MIR '08). pp 44-51. DOI:https://doi.org/10.1145/1460096.1460106. (Year: 2008).*

* cited by examiner

CONTEXT-INCLUSIVE FACE CLUSTERING

BACKGROUND

People are increasingly relying upon digital photography for their personal images. When combined with digital images from other sources, this results in a huge volume of images being stored across various networks. It is often desirable to be able to locate subsets of these images that include representations of various people. This can include, for example, celebrities or famous persons for news and publications, or individual users for social networking and other such purposes. While facial recognition can be used to identify people in various images, the variations in the images due to lighting, angle, differences in age, and other such aspects can result in the same person being identified as different people in different images. Existing facial recognition approaches are limited in accuracy for such purposes, and there is no existing approach that is able to perform at the scale needed for the large volume of image data available.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the identification of persons represented in multiple images. In particular, various approaches provide for the determination of users represented in multiple images based upon accurate facial similarity metrics, where the similarity accuracy can be improved using contextual information. A set of models can be trained to process image data, and facial features can be extracted from a face region of an image and passed to the trained models. Resulting feature vectors can be concatenated and the dimensionality reduced to generate a highly accurate feature vector that is representative of the face in the image. The feature vector can be used to locate similar vectors in a multi-dimensional vector space, where similarity can be determined based at least in part upon the distance between the endpoints of those vectors in the vector space. Context information such as user annotations, timestamp data, location data, estimated age or gender, and the like can be used to adjust the similarity determination. Similar vectors can be clustered together such that the faces represented by those images are associated with the same person.

Various other such functions can be used as well within the scope of the various embodiments as would be apparent to one of ordinary skill in the art in light of the teachings and suggestions contained herein.

Figure 1:
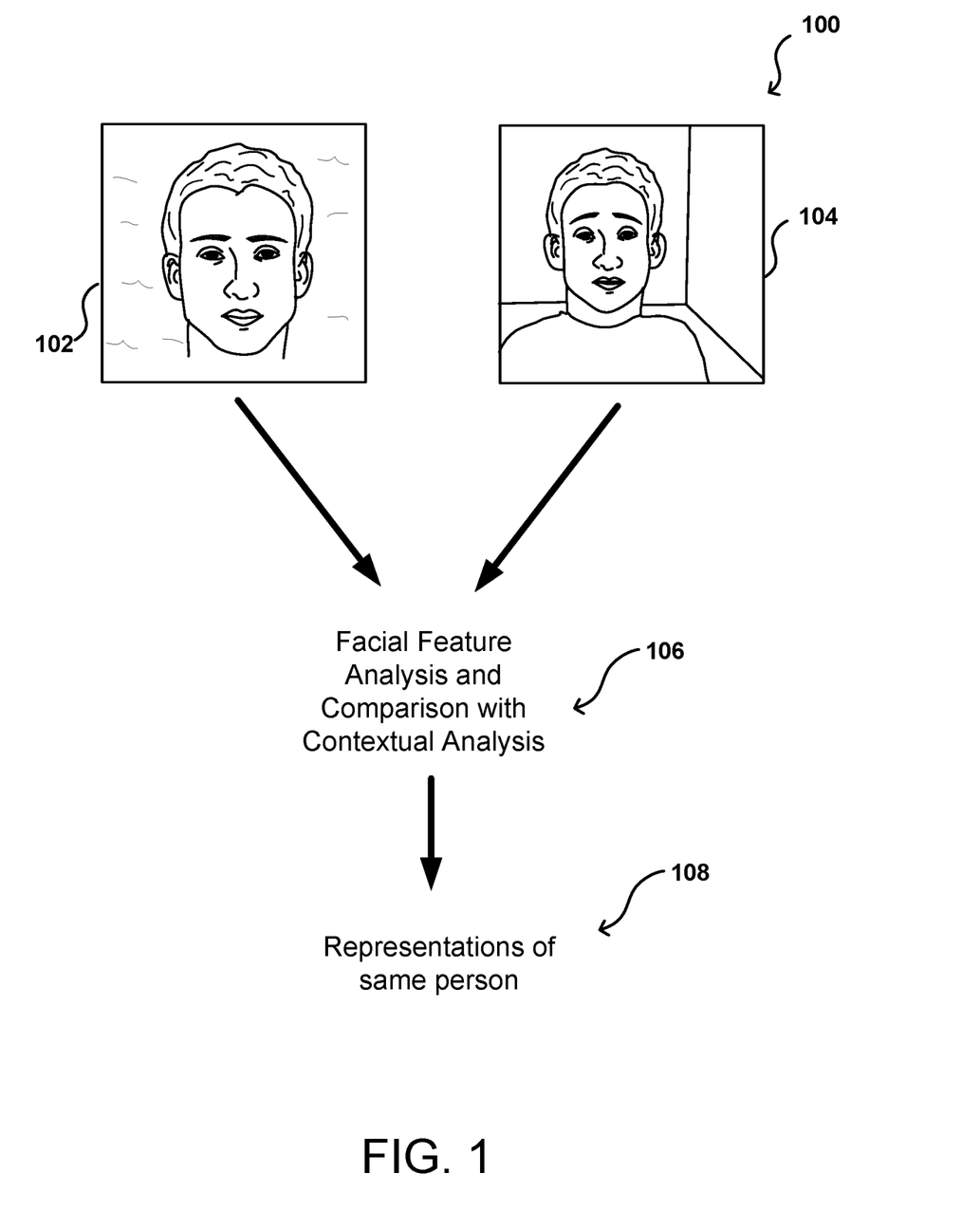
FIG. 1 illustrates an example approach to clustering images including different representations of a person that can be utilized to implement aspects of various embodiments.

FIG. 1 illustrates an example approach 100 to determining that a person is represented in different images that can be utilized in accordance with various embodiments. In this example, a single person is represented in two different images 102, 104. A conventional approach would be to analyze each image using facial recognition software to determine an identity, and then if the identities match those images could both be associated with the same person, as may be useful for social networking, image storage, and the like.

It can be desirable in at least some embodiments to utilize clustering with face recognition. Face clustering refers to the clustering of a collection of faces into different groups, where each group contains substantially similar faces that likely correspond to the same person. There will be differences in the determinations or confidence levels due to factors such as lighting, pose, age, occlusion, resolution, and the like, that can require some level of clustering in order to say with confidence that a group of images correspond to a particular person. For an ideal clustering algorithm, each cluster will contain only face data for a single person, resulting in homogeneity. Further, in an ideal situation the face data for a person will only be contained within a single cluster. Since there are images that will include multiple people, however, it can be difficult to have images of a person only in a single cluster such that it can be desired to divide the clusters corresponding to a user into as few clusters as possible for completeness. Conventional approaches can perform face detection on an image to localize the face information, and extract features from the face region. This face data is then used to perform face recognition, and the recognition data can then be provided to a clustering or grouping algorithm.

Unfortunately, the differences between images can make it difficult to correlate users in different images, particularly when only looking at the face region, which may be a small fraction of the overall image. In one embodiment, the facial region is a square region centered on the face and extending from just above the eyebrows to the chin of the face. In addition to considering the image or pixel data corresponding to the face region, as may be defined by a bounding box or other such boundary, approaches can attempt to use contextual information 106 with the data from the facial feature analysis for purposes such as identification and comparison, etc. The contextual information can help to determine that different representations correspond to the same person 108 with a relatively high degree of confidence.

Figure 2A:
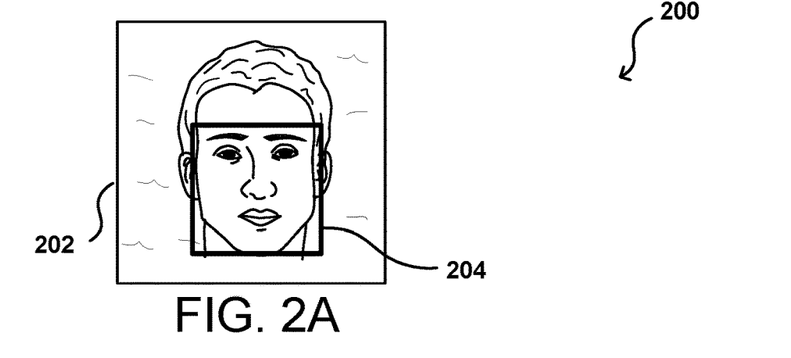
FIGS. 2A, 2B, 2C and 2D illustrate an example approach to generating feature vectors and clustering vectors with similar endpoints that can be utilized in accordance with various embodiments
Figure 2B:
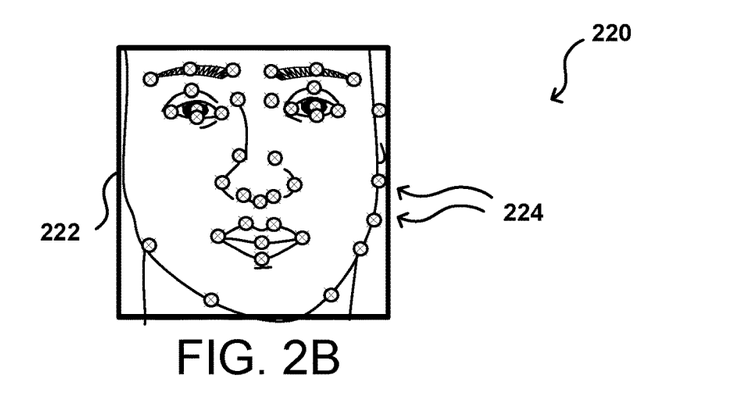
Figure 2C:
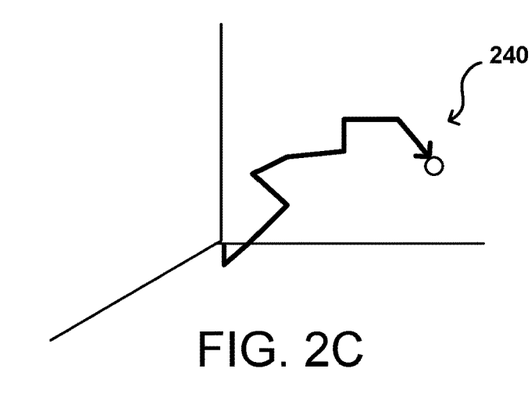
Figure 2D:
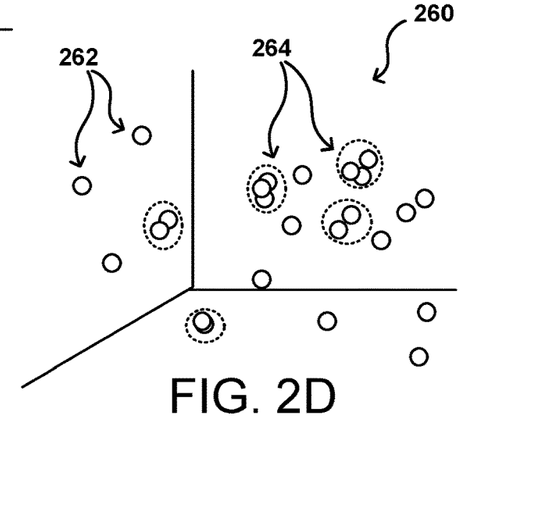

In the example configuration 200 of FIG. 2A, an image 202 can be analyzed using face detection to determine a region 204 corresponding to the face of a person represented in the image. As mentioned, there may be multiple persons represented in an image, and a region or bounding box may be determined for each person. There may be minimum requirements for detection, such as a minimum number of pixels to be able to determine with confidence that the region corresponds to the face of a person. Once the face region 204 has been determined, a facial feature analysis can be performed as illustrated in the example approach 220 of FIG. 2B wherein various facial features are determined and/or extracted for the image. The features can be used to generate a high-dimensional feature vector 240, such as may result from the use of a feature extractor or deep neural network, among other such options. The feature vector 240 illustrated in FIG. 2C is plotted in n-dimensional feature space, where the endpoint of the vector defines the position of the face in feature space. An attempt can then be made, as illustrated in the plot 260 of FIG. 2D, to cluster feature points 262 corresponding to the same face or person, as the various feature points for a face should be in close proximity in the plot. As mentioned, however, variations between images can result in some amount of variation in the locations of these feature points, such that the grouping of the points into clusters 264 for a single person may not be straightforward.

As mentioned, many conventional approaches only consider facial features extracted from the determined facial regions of the various images. Such an approach ignores other regions of the image that can be useful in recognizing a person, as may include their hair, clothing, or other such features. The shape and color of a person's hair can help to recognize that person with respect to others with similar facial features. Further, the same person might wear the same shirt, or style of shirt, in different images, which can help to correlate various images. Other information can be useful as well, as may be obtained from the pixel data or metadata of an image. For example, the image data (from the face region or otherwise) can be analyzed to estimate an age and gender of the person represented. If there is a timestamp with the image, the estimated age can be used to correlate people as the facial features will change over time. There may be different facial representations of a person over time, and knowing the age of the person at the time of the image can help to better correlate the images. Further, geo-location data from the image can be used to correlate representations of a person based upon known locations of that user, which can be further improved if combined with a timestamp such that a determination can be made that the person was at or near that location at that time.

Another type of contextual information that can be advantageous in clustering is user annotation data. A user might add annotations to identify people in an image, which can be very helpful in verifying the identity. The annotations will generally indicate a first and maybe a last name, which can help to narrow the search space and/or increase the confidence in an identity determination. If user annotations can be determined for a person represented in a cluster, then those annotations can potentially be propagated to other images in that cluster for purposes of determining the identity of the person. In other embodiments, information about the source of the image through the annotations or image data can help to include the image in clusters including the source, and the inclusion of identified people with that source can help to improve confidence based on the correlation of those people. Various other annotations can be helpful as well, where the annotations can in some way be tied to information known for a person, as may relate to age, location, interests, place of employment, groups of friends or acquaintances, and the like.

Figure 3A:
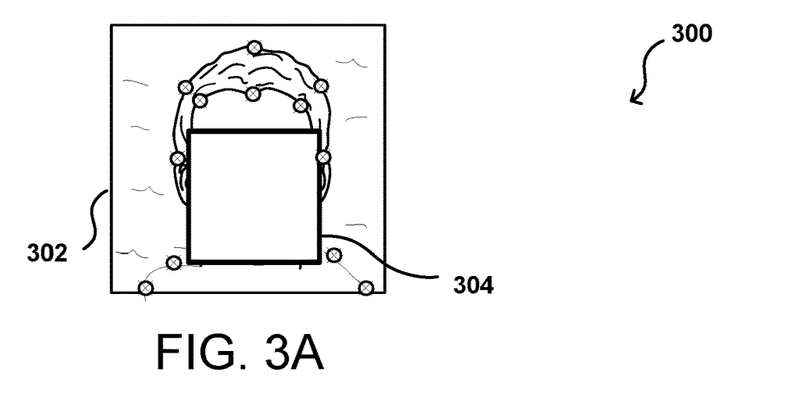
FIGS. 3A, 3B and 3C illustrate an example approach to utilizing context information with facial features that can be used to implement aspects of the various embodiments.
Figure 3B:
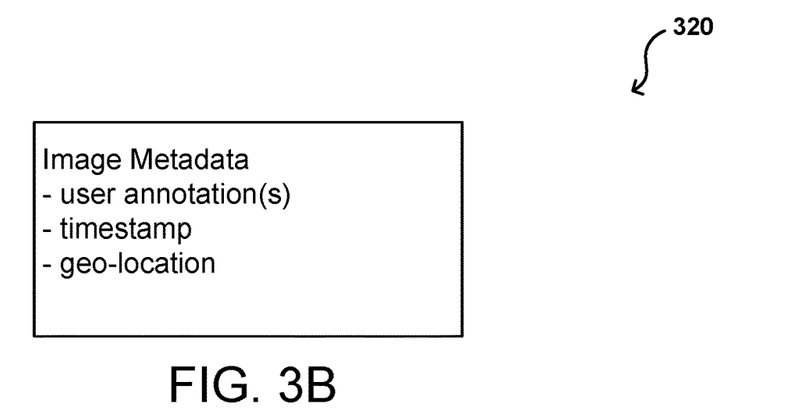
Figure 3C:
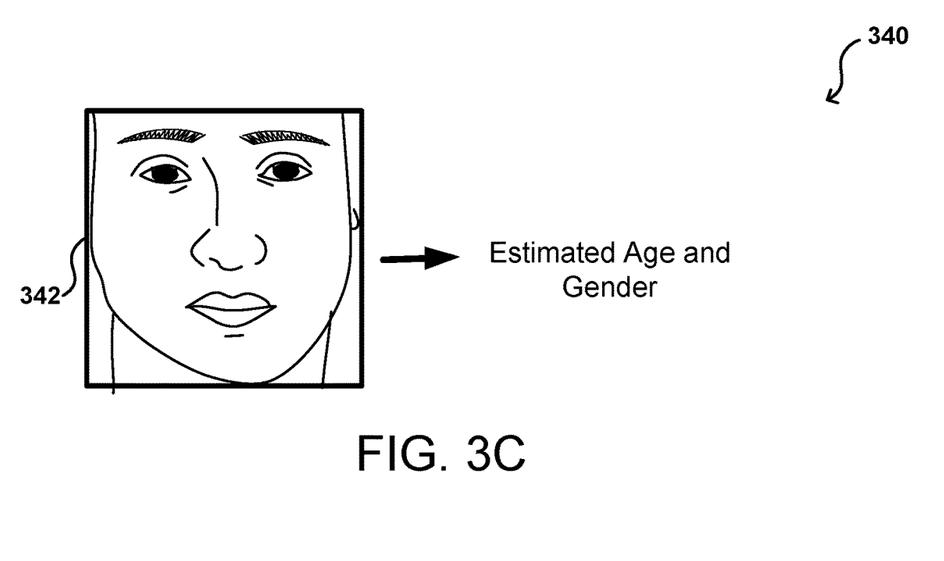

FIGS. 3A through 3C illustrate types of contextual information that can be determined for an image in accordance with various embodiments. In the image 302 of FIG. 3A, the pixel data for the region of the image outside the facial region 304 can be considered. As illustrated, this region can be analyzed to determine information about the hair or clothing of a person, among other such aspects. This can include, for example, both shape and color information, as well as pattern, texture, or other information where discernible. In the image data 320 of FIG. 3B, image metadata can include other contextual information that can be utilized with facial analysis, as may include user annotations, timestamp data, geo-location data, and the like. In the facial region 342 illustrated in the approach 340 of FIG. 3C, the facial data can be analyzed to estimate age and gender of the person as well. Any or all of this contextual information can be used to assist with user recognition and/or clustering in accordance with the various embodiments. As mentioned, any or all of these can be used for pre-processing, such as to reduce a search space, or for post-processing, in order to adjust a confidence level of the recognition or clustering. For example, an annotation identifying a person might be used initially to reduce the search space to people with that name, in order to simplify the amount of processing needed. Information such as age and location can be used for purposes of clustering after a face has been recognized or processed, in order to improve the confidence in a determination as to whether faces correspond to the same person and should be included in the same cluster(s).

In some embodiments, each of these instances of contextual information can be used to attempt to improve a confidence in a recognition or clustering determination. This can include, for example, a weighted combination of some or all of this information. The relative weightings can be learned through experimentation or machine learning, among other such options, and updated over time. As mentioned, annotations may be highly indicative of identity while factors such as hair color and clothing may be much less reliable, such that their relative weightings should be set accordingly. In at least some embodiments a facial recognition and/or clustering determination can be accompanied by a certainty or confidence value, for example, and the confidence can be adjusted by applying a weighted function of the contextual values.

In some embodiments, an interface such as an application programming interface (API) can be exposed that can enable person information to be extracted or determined for one or more photos submitted or identified through the API call. A call can be made that can identify a collection of digital images, or even video or other media in some embodiments, and the data can be processed to identify and cluster the face data in order to correlate the images with persons represented in those images. As mentioned, approaches in accordance with various embodiments can attempt to optimize for both homogeneity and completeness, in order to provide accurate recognition and clustering of the persons. In some embodiments, a set of face feature models can be trained to extract the facial features. As mentioned, each face can be represented by a feature location and/or feature vector in a high dimensional feature space. Different representations of the same face in different images will have similar feature locations or vectors that can then be clustered to correspond to a single person. In one embodiments sixty-four dimension floating point values can be determined for each feature value. The values can then be grouped or clustered using an appropriate clustering algorithm, such as a hierarchical agglomerative clustering algorithm or a k-nearest neighbors (KNN) based search. In a hierarchical agglomerative clustering-based approach, the analysis would start and the leaf nodes and a determination made whether to merge the node with a parent node based at least in part upon the similarity determinations. The process can continue until the top of the hierarchy is reached or no more merging occurs. A similar approach can be used to merge clusters together based upon factors such as centroid separation distance in multi-dimensional feature space. Using such an approach, feature values that are substantially the same, or similar within a determined threshold or difference range, can be merged or treated as part of a single cluster. There can be various thresholds used to determine whether to merge or cluster two values, and there can be a hierarchical or iterative approach used in some embodiments to attempt to determine the appropriate cluster for a specified feature value.

In one embodiment, three different networks or models can be trained using a set of training data. The training data can include a set of images that are annotated to indicate identities of persons represented in those images. This might include, for example, images of celebrities or other persons that are readily identifiable in the images, where there also can be several different, high quality views of each celebrity under different imaging conditions. The training set with annotations can be used to train the models so that each model can identify people based on the information and relationships learned from the training set. Each model can use different functions or other approaches to determining relationships between images and identities. The values from each approach can be compared to attempt to arrive at a more accurate determination. The values from the models can then be compared to attempt to determine whether the distance between those values in feature space are within a determined similarity threshold distance of each other. Similarly, the distance between each value and a center point of a pre-existing cluster can be considered when determining whether to include those points in the cluster. If a particular cluster is associated with a person having a specific feature vector, then that cluster center point can be used as an anchor point when calculating the distance for new features.

When training the three different models in one example, the output of those models can each be a sixty-four dimensional feature vector. These three values can then be concatenated into a single 192 dimensional vector representative of the facial features from the image. In order to simplify processing and reduce the amount of resources required, a principle components analysis (PCA) or other such approach can be used to reduce the dimensionality of these vectors back to sixty-four dimensions while minimizing loss in accuracy. After this process has completed, there is a sixty-four dimensional vector representing each face detected in the various images, where that vector is the result of processing using three different models.

As mentioned, these vectors could be used with clustering to provide a relatively accurate indication of identity of people represented in the various images. It can be desirable, however, to improve the accuracy of the clustering or determinations. Various types of contextual information can be determined from the images as well, which can be used with the face feature data. The contextual data can include, for example, background pixel data, From a given picture there can be a significant amount of additional contextual information in addition to the face feature data. This can include, for example, background and timestamp information. You can also have face attributes (e.g., estimated age and gender) obtained from the face analysis. As mentioned, the contextual information can be used to improve the clustering accuracy, such as by adjusting or correcting the feature values in feature space or using the information as additional factors in determining whether to include a face vector in a specific cluster, among other such options. As mentioned, the outputs of the clustering determination can be an indication of whether to merge two face vectors based on information such as the difference between the corresponding feature vectors or difference from a cluster center point, at least with respect to a similarity threshold or other such value, as well as any additional considerations or adjustments based on the contextual information. In some embodiments there might be two similarity thresholds. A first threshold distance might indicate that any two feature points within a threshold distance of each other and a cluster center should be merged together. A second threshold might indicate that any pair of feature points that are past this distance apart, but within the second threshold, should be merged only if so indicated based upon the contextual information, or if the confidence score is above a minimum confidence value, among other such options.

In one embodiment, a face table is maintained in which each face has its own entry with a unique identifier. For any additional faces that are merged with this face, those faces may have their own identifier but be linked to the identifier for the master face entry for a specific person. The table can be augmented with context information as well, as may include timestamp, age, gender, geo-location, facial attributes, hair information, clothing data, and the like, that can be used for future clustering determinations and similarity evaluations. As mentioned, in some embodiments a similarity score is calculated between pairs of faces using the weightings of the context information learned from the training data and/or updated over time.

Figure 4:
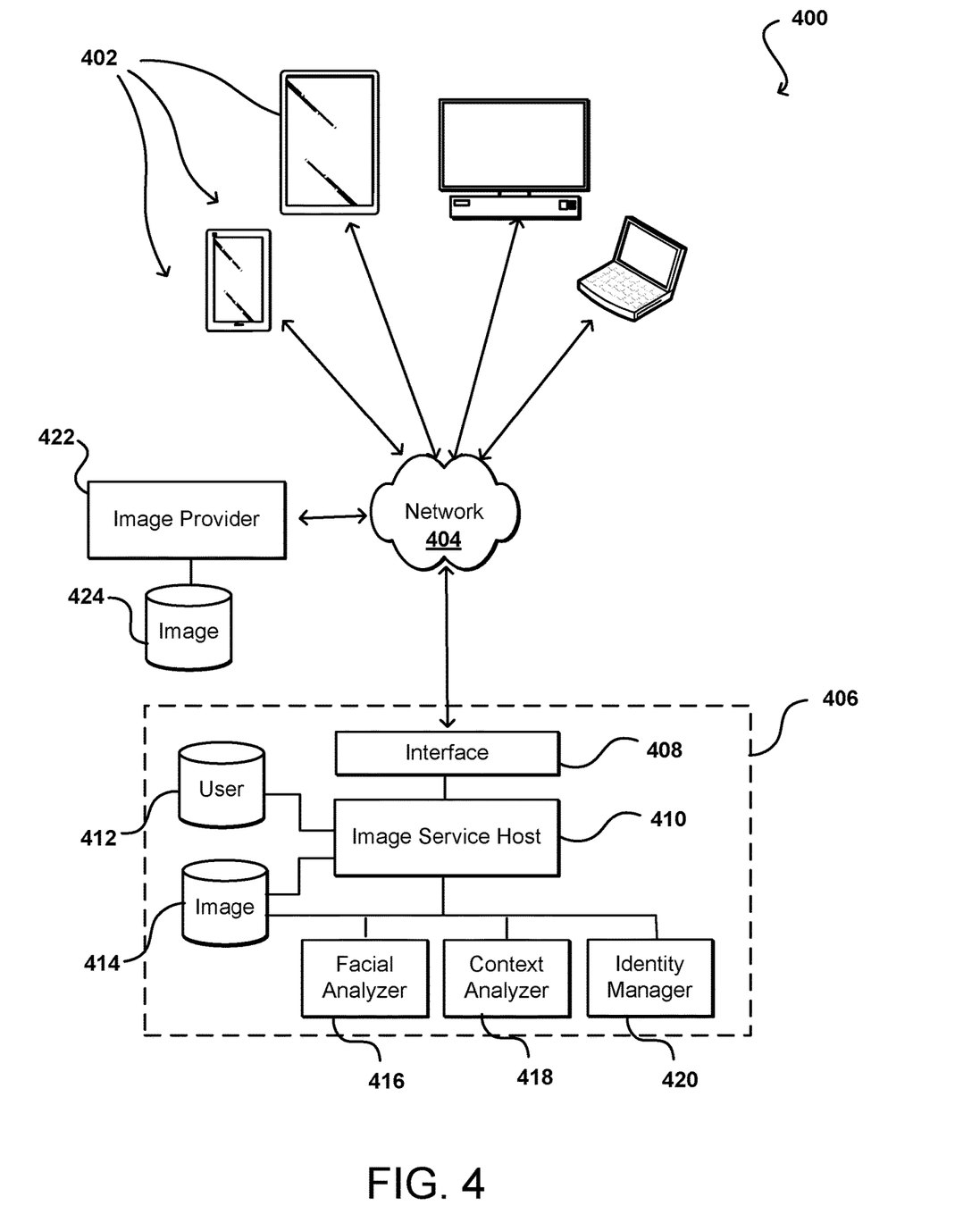
FIG. 4 illustrates an example architecture for analyzing images and correlating people represented in those images that can be analyzed in accordance with various embodiments.

FIG. 4 illustrates an example environment 400 in which aspects of the various embodiments can be implemented. In this example, users are able to use any of a number of different client devices 402 to submit requests across at least one network 404 to a resource (or service) provider environment 406. A client device can include any appropriate electronic device operable to send and receive requests, image data, or other such information over an appropriate network. Examples of such client devices include personal computers, tablet computers, smart phones, notebook computers, wearable computers (smart glasses or watches), and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein. In at least some embodiments, a user wanting to utilize a portion of the resources can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 406 and/or to the client device 402, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user in a user data repository 412. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

A resource manager (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, and validating user input. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, the various client devices 402 can be used to submit image data across the at least one network 404 to be stored in image storage 414 in the resource provider environment 406. Additional third party image providers 422 can also provide image data, as may have been stored in third party image repositories 424 or other such locations. The third party image data can include celebrity data or other data useful for training, as well as images that can be classified or analyzed using approaches discussed herein.

As mentioned, it can be desirable in at least some situations to identify people represented in the various images, which can provide for image search or other such applications using information for specific people. An image service host 410 can be responsible for tasks such as image storage, indexing, search, and retrieval, either as part of its own functionality or in combination with various other resources of the resource provider environment. The image service host 410 can also be responsible for processing the images and ensuring that persons represented in the images are identified, among other such tasks. In this example, the image service host can cause each received image (or a selected subse5t of images) to be processed by a facial analyzer 416. The facial analyzer system or service can analyze the indicated images to determine face regions and extract the facial features from the image data. As known for face analysis, the facial features can include the relative locations of various features that are uniquely arranged for different people, as may relate to the corners of a person's eyes or mouth, relative positions of the nostrils or ears, etc. This set of points can function as a fingerprint that is uniquely representative of that person. Instead of maintaining the set of feature point data, a feature vector can be generated that is a combination of those factors, which corresponds to a resulting feature point in multi-dimensional feature space. The output of a facial analyzer can be a feature vector, feature point, or other such value. In some embodiments the facial analyzer 416 can also output a determined identity based upon feature vector matching or another such process.

In addition to the facial analyzer, the image data for an image can be provided to a context analyzer 418 that can determine the various context information for the image. This can include, for example, extracting annotation, time stamp, and geo-location data from the image if available. This can also include, however, analyzing information outside the face region that can be used to improve the accuracy of the similarity or clustering determinations. For example, the context analyzer 418 can determine information about the hair, pose, clothing, gestures, or other aspects of the representation of the person in the image that can help to recognize the person. The results from the facial analyzer 416 and the context analyzer 418 can then be fed to an identity manager 420 that can perform the similarity and/or clustering analysis in order to attempt to cluster the image by person so that a person is in as few clusters as possible and each cluster ideally includes only one person. The results of the identity manager 420 can then be fed to an image database 414 or user database 412 that tracks identifiers of images associated with specific persons or identities. As mentioned, the contextual information can be stored as well for use in future clustering, similarity, or identification analyses.

Figure 5:
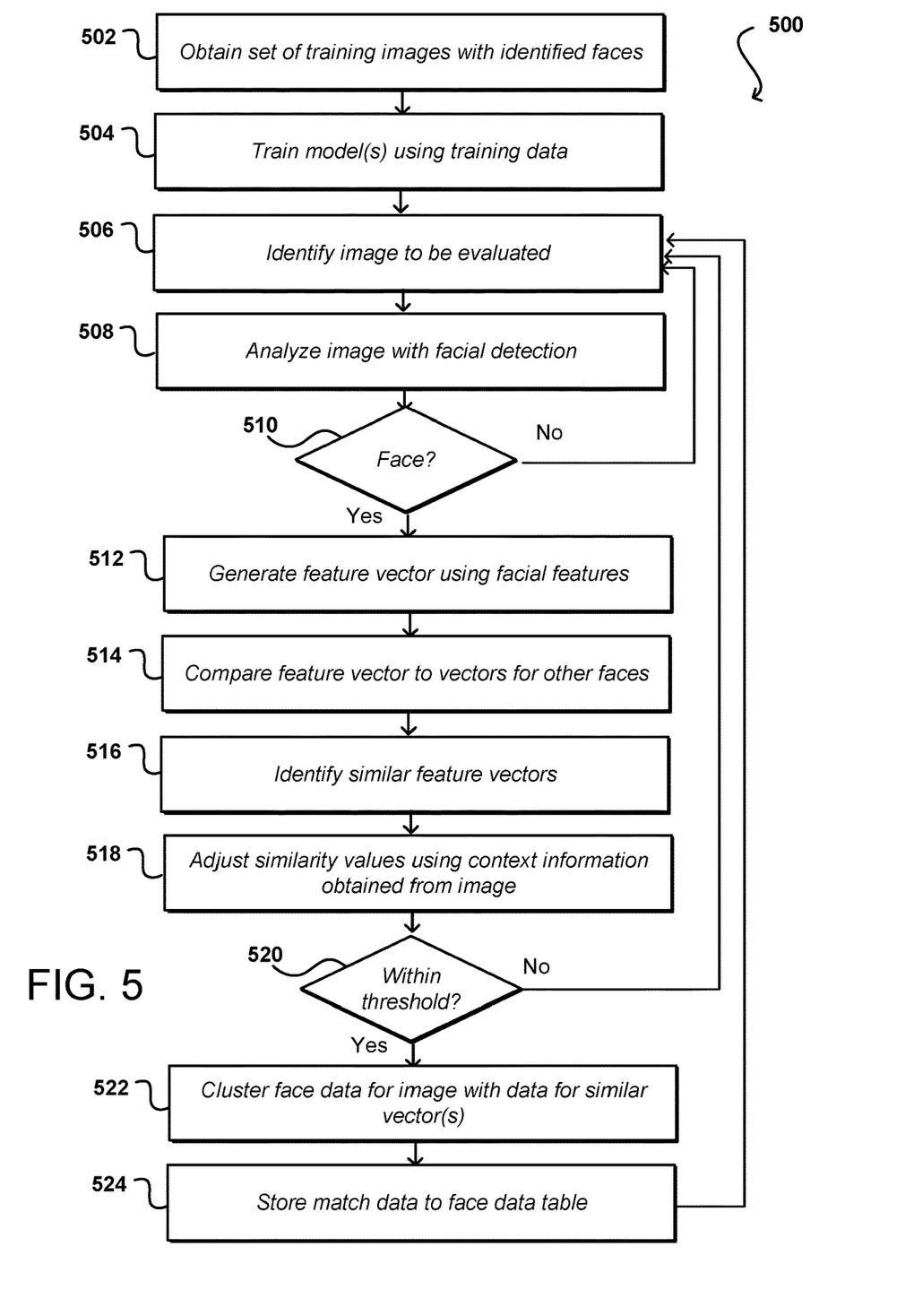
FIG. 5 illustrates an example process for correlating specific persons represented in images that can be utilized in accordance with various embodiments.

FIG. 5 illustrates an example process 500 for determining images with similar faces that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a set of training images is obtained 502, where each image contains information identifying a person whose face is represented in the image. One or more models can be trained 504 using the training data, such as a set of three models that each use different functions for analyzing and/or classifying the input image data. These can include, for example, different neural networks or other classification models. After the models are trained, an image can be identified 506 that is to be evaluated using the models. As mentioned, this image can be an individual image received with a request or part of a set of images, among other such options.

The image can first be analyzed 508 using a facial detection algorithm to determine whether a face is likely represented in the image. Various lightweight detection algorithms can be used to quickly detect the presence of a face, such that images without such a representation do not undergo full processing in order to conserve resources. If it is determined 510 that a face is present in the image then a feature vector can be generated 512 using facial features corresponding to the region of the detected face representation. The feature vector can be generated in at least some embodiments by processing the facial feature data using the trained model(s) discussed previously. The feature vector for the face can then be compared 514 to feature vectors for other faces generated from other images. One or more similar feature vectors can be identified 516, such as those with endpoints in feature space that are less than a similarity threshold distance apart. The similarity determination can be adjusted 518 using contextual information obtained from the image, as may relate to timestamps, location data, feature data from outside the face region of the image, and the like. If it is determined 520 that the feature vectors fall within a similarity threshold or criterion then the face data for the image can be clustered 522 with data for the similar vectors and the match data or clustering can be stored 524 to a face data table or other such location for purposes of recognition and correlation of the faces represented in those images and by those vectors.

Figure 6:
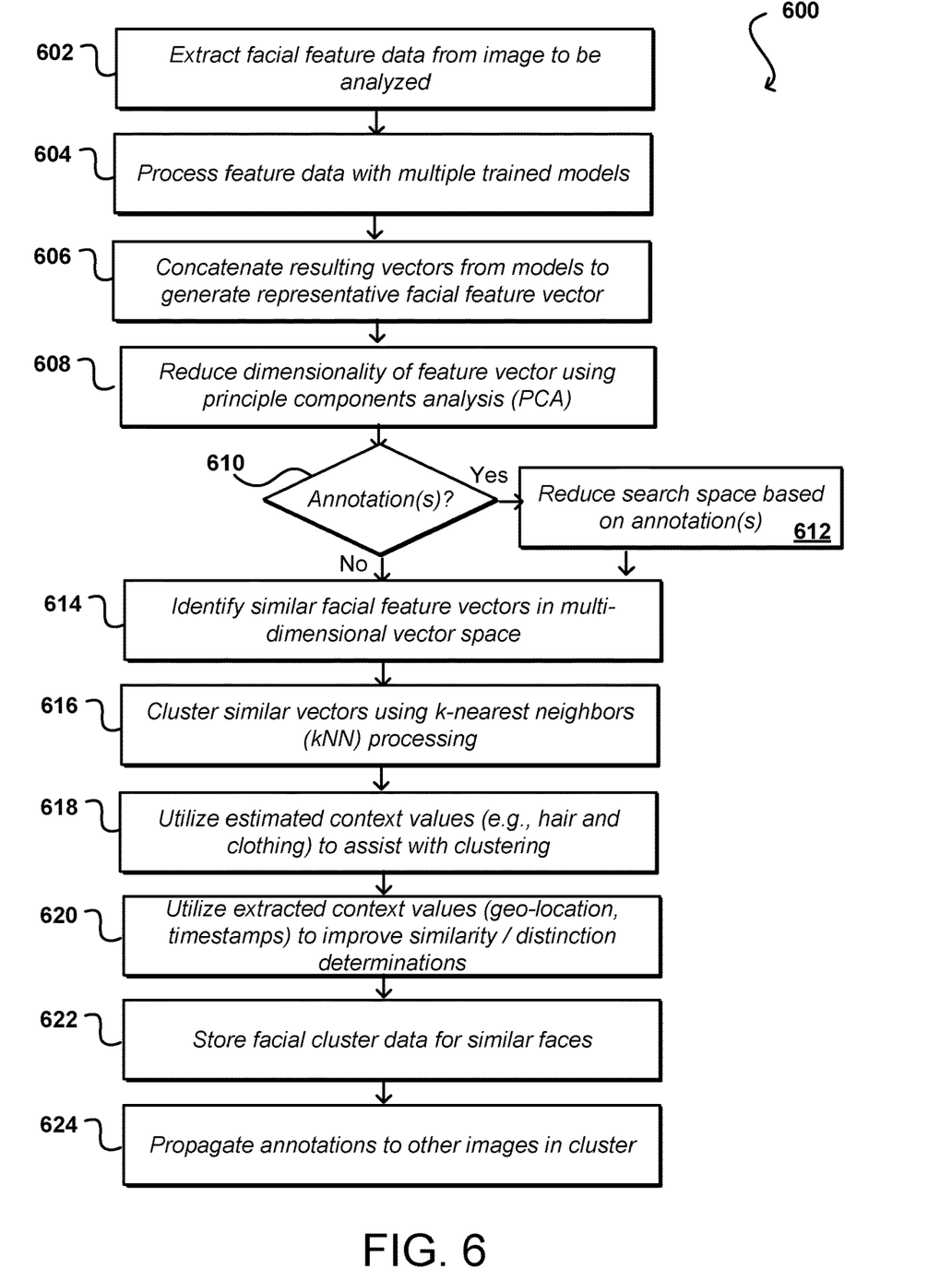
FIG. 6 illustrates an example process for using contextual information for person recognition that can be utilized in accordance with various embodiments.

FIG. 6 illustrates an example process 600 for determining the similarity that can be utilized in accordance with various embodiments. In this example, facial feature data is extracted 602 from an image to be analyzed. As discussed, this can include detecting a face region of an image and then identifying facial features from within that region. The feature data can be processed 604 using multiple trained models (i.e., two or more models using different determination functions), although other numbers and selections of models or algorithms can be used as well as discussed and suggested herein. Each model can produce a feature vector, such as a multi-dimensional feature vector, and these vectors can be concatenated 606 into a representative feature vector for the face represented in the image. A dimensionality of the feature vector can be reduced 608 using principle components analysis (PCA) or another such approach.

A determination can be made 610 as to whether there are annotations with the image, and whether those annotations relate to a name or identifying information for the face. If so, the search space for the image can be reduced 612 to only look at options that correspond to the name or information. Similar facial feature vectors can be identified 614 in the multi-dimensional search space, where the vectors may have been generated using a similar process and are determined to be similar using one or more similarity criteria as discussed herein. Similar vectors can be clustered 616 using a k-nearest neighbors (kNN) or similar approach. The similarity and/or clustering determinations can be adjusted using a weighted combination of context data for the image. As mentioned, this can include utilizing a weighted combination of factors such as age, gender, timestamp, location, hair features, clothing, and the like. As discussed in more detail elsewhere herein, these factors can be obtained through an API or learned using a trained model, among other such options. The weightings for the combination can be learned experimentally or through machine learning, among other such options. In this example, estimated context values such as the estimated age and gender of the person, as well as hair and clothing details, can be used to assist with clustering, such as to determine whether two feature vectors should be grouped together when a confidence is near a minimum confidence value. In such situations, the estimated context information can be used to improve the accuracy of the confidence based on the additional factors, which can help to determine whether or not to join the face with a cluster, or merge two clusters together. This example approach can also utilize 620 extracted contextual information, such as the time and geo-location to assist with similarity and distinction determinations. For example, if two faces are similar but are determined to be for people of different ages or people who were at different locations at a particular time, then it can be determined that the faces likely do not belong to the same person and should not be clustered together. Facial cluster or similarity data can then be stored 620 to a face data table or other such repository for vectors that ultimately satisfy one or more similarity criteria, such as proximity or distance in feature space after the application of context data, or a minimum level of confidence after application of the context data. If there are annotations for one or more images in a cluster that relate to the person, for example, then those annotations can also be propagated 624 out to other images in the cluster that also include a representation of that person.

Figure 7:
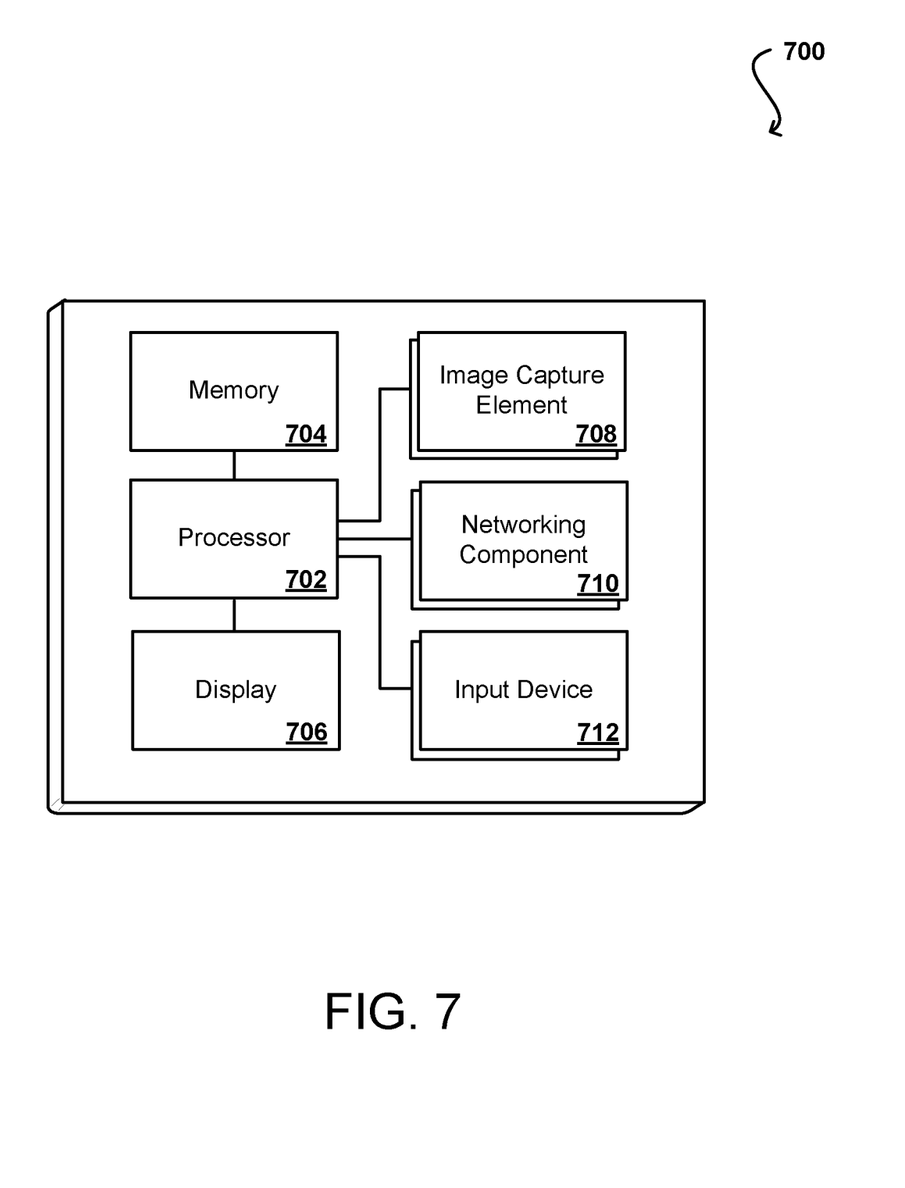
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device can also include at least one image capture element 708, such as a digital camera including a CMOS or CCD sensor, among other such options. The device typically will include one or more networking components 710, such as a port, network interface card, or wireless transceiver that enables communication over at least one network. The device can include at least one input device 712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
 determining, in an input image, a face region containing a representation of a face of a person;
 identifying a set of facial features from the face region of the input image;

processing the set of facial features using a set of trained face recognition models to generate individual feature vectors that are multi-dimensional and that are representative of the face;
concatenating the individual feature vectors to generate a representative feature vector;
generating a facial feature vector by reducing dimensionality of the representative feature vector;
determining an existing feature vector, for a face of an identified user, that is within a similarity threshold distance of the facial feature vector in a multi-dimensional vector space;
adjusting a similarity value between the facial feature vector and the existing feature vector based at least in part upon context information obtained with the input image;
clustering, using a hierarchical agglomerative clustering algorithm, the facial feature vector with the existing feature vector as corresponding to the identified user; and
providing information for the identified user based on the clustering.

2. The computer-implemented method of claim 1, further comprising:
generating a respective individual feature vector of the individual feature vectors using an individual one of the trained face recognition models; and
performing principal component analysis (PCA) on the representative feature vector to reduce the dimensionality of the representative feature vector and arrive at the facial feature vector.

3. The computer-implemented method of claim 1, further comprising:
clustering the facial feature vector with the existing feature vector using a k-nearest neighbors (kNN)-based search in the multi-dimensional vector space.

4. The computer-implemented method of claim 1, further comprising:
determining at least one identity annotation included with the context information to reduce a search space in the multi-dimensional vector space.

5. The computer-implemented method of claim 1, further comprising:
determining the context information for the input image, the context information including at least one of a timestamp, a geo-location, an estimated age of the person, an estimated gender of the person, hair color or shape information, clothing information, or user annotation; and
adjusting the similarity value using a weighted combination of values from the context information.

6. A computer-implemented method, comprising:
generating a representative feature vector by a concatenation of the individual feature vectors corresponding to a face region of an input image;
determining a facial feature vector from the representative feature vector by reducing dimensionality of the representative feature vector;
locating at least one existing feature vector in a multi-dimensional feature space that is within a threshold distance from the facial feature vector;
comparing contextual information for the input image and the at least one existing feature vector;
correlating the facial feature vector with the at least one existing feature vector based at least in part upon the facial feature vector satisfying at least one similarity criterion with respect to the at least one existing feature vector as determined using the contextual information; and
providing identity information for a person represented in the input image based at least in part upon the identity information being associated with the at least one existing feature vector.

7. The computer-implemented method of claim 6, further comprising:
processing the input image using a face detection algorithm; and
determining, with at least a minimum confidence, that the input image includes a representation of a human face before determining the facial feature vector.

8. The computer-implemented method of claim 6, further comprising:
identifying a set of facial features in a face region of the input image using a set of trained face recognition models; and
generating the individual feature vectors for the set of facial features using each of the trained face recognition models.

9. The computer-implemented method of claim 6, further comprising:
performing dimensionality reduction on the representative feature vector, using principal component analysis (PCA), to arrive at the facial feature vector for the face represented in the input image.

10. The computer-implemented method of claim 8, wherein each of the trained face recognition models uses a different face recognition function.

11. The computer-implemented method of claim 6, further comprising:
determining an identifying user annotation associated with the input image; and
reducing a search space in the multi-dimensional feature space based at least in part upon the identifying user annotation.

12. The computer-implemented method of claim 6, further comprising:
determining the context information for the input image, the context information including at least one of a timestamp, a geo-location, an estimated age of the person, an estimated gender of the person, hair color or shape information, clothing information, or user annotation; and
adjusting the similarity value using a weighted combination of values from the context information.

13. The computer-implemented method of claim 6, further comprising:
determining a bounding box for the face region of an input image, wherein at least a portion of the context information is determined using pixel data outside the bounding box in the input image.

14. The computer-implemented method of claim 6, further comprising:
clustering the facial feature vector with the at least one existing feature vector using a k-nearest neighbors (kNN)-based search in the multi-dimensional vector space.

15. The computer-implemented method of claim 6, further comprising:
exposing an application programming interface (API) for obtaining the identity information for the input image.

16. A system, comprising:
at least one processor; and memory including instructions that, when executed by the at least one processor, cause the system to:

generate a representative feature vector by a concatenation of the individual feature vectors corresponding to a face region of an input image;

determine a facial feature vector from the representative feature vector by reducing dimensionality of the representative feature vector;

locate at least one existing feature vector in a multi-dimensional feature space that is within a threshold distance from the facial feature vector;

compare contextual information for the input image and the at least one existing feature vector;

correlate the facial feature vector with the at least one existing feature vector in response to the facial feature vector satisfying at least one similarity criterion with respect to the at least one existing feature vector based at least in part upon the contextual information; and provide identity information for a person represented in the input image based at least in part upon the identity information being associated with the at least one existing feature vector.

17. The system of claim 16, wherein the instructions when executed further cause the system to:

process the input image using a face detection algorithm; and determine, with at least a minimum confidence, that the input image includes a representation of a human face before determining the facial feature vector.

18. The system of claim 16, wherein the instructions when executed further cause the system to:

identify a set of facial features in a face region of the input image using a set of trained face recognition models;

generate the individual feature vectors for the set of facial features using each of the trained face recognition models; and perform dimensionality reduction on the representative feature vector, using principal component analysis (PCA), to arrive at the facial feature vector for the face represented in the input image.

19. The system of claim 16, wherein the instructions when executed further cause the system to:

determine the context information for the input image; and adjust the similarity value using a weighted combination of values from the context information.

20. The system of claim 16, wherein the instructions when executed further cause the system to:

cluster the facial feature vector with the at least one existing feature vector using a k-nearest neighbors (kNN)-based search in the multi-dimensional vector space.

* * * * *